(12) United States Patent
Juneja

(10) Patent No.: US 10,187,217 B1
(45) Date of Patent: Jan. 22, 2019

(54) METHODS, SYSTEMS, AND COMPUTER READABLE MEDIA FOR EFFICIENT MAPPING OF RULE PRECEDENCE VALUES AND FILTER PRIORITY VALUES

(71) Applicant: Oracle International Corporation, Redwood Shores, CA (US)

(72) Inventor: Rohit Juneja, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/647,210

(22) Filed: Jul. 11, 2017

(51) Int. Cl.
*H04L 12/14* (2006.01)
*H04W 4/24* (2018.01)
*G06F 17/30* (2006.01)

(52) U.S. Cl.
CPC .... *H04L 12/1407* (2013.01); *G06F 17/30377* (2013.01); *H04W 4/24* (2013.01)

(58) Field of Classification Search
CPC ........... H04L 12/1407; G06F 17/30377; G06F 17/3038; G06F 17/30383; H04W 4/24
See application file for complete search history.

(56) References Cited

U.S. PATENT DOCUMENTS

| | | | |
|---|---|---|---|
| 8,605,655 B1 * | 12/2013 | Sahai | H04M 15/66 370/328 |
| 8,949,413 B2 | 2/2015 | Ramaraj et al. | |
| 9,282,483 B2 | 3/2016 | Lovsen et al. | |
| 2006/0291449 A1 * | 12/2006 | Babbar | H04L 47/10 370/352 |
| 2007/0259673 A1 * | 11/2007 | Willars | H04W 52/0225 455/453 |
| 2008/0019275 A1 | 1/2008 | Mudireddy et al. | |
| 2011/0122885 A1 | 5/2011 | Hedman et al. | |
| 2013/0088966 A1 | 4/2013 | Mahkonen et al. | |

FOREIGN PATENT DOCUMENTS

WO    WO 2012/065657 A1    5/2012

OTHER PUBLICATIONS

"Packet-Filter-Information AVP," http://www.lteandbeyond.com/2012/01/gx-interface-sitting-between-pcrf-and.html, pp. 1-4 (Jan. 2012).

(Continued)

*Primary Examiner* — Dinh Nguyen
(74) *Attorney, Agent, or Firm* — Jenkins, Wilson, Taylor & Hunt P.A.

(57) ABSTRACT

Methods, systems, and computer readable media for efficient mapping of rule precedence values and filter priority values are disclosed. In some examples, a method occurs at a policy rules node for determining policies in a mobile network. The method may include generating a rule installation request including a rule precedence value, at least one packet filter associated with the rule precedence value, and a filter priority value indicating a first value of a filter priority value range associated with the at least one packet filter. The method may also include sending the rule installation request to a policy enforcement node for installation on user equipment (UE).

17 Claims, 12 Drawing Sheets

(56) References Cited

OTHER PUBLICATIONS

"Digital cellular telecommunications system (Phase 2+) (GSM); Universal Mobile Telecommunications System (UMTS); General Packet Radio Service (GPRS); Service description; Stage 2 (3GPP TS 23.060 version 13.8.0 Release 13)," ETSI TS 123 060 V13.8.0, pp. 1-363 (Oct. 2016).

"Universal Mobile Telecommunications System (UMTS); LTD; Policy and Chargin Control (PCC); Reference points (3GPP TS 29.212 version 13.5.0 Release 13)," ETSI TS 129 212 V13.5.0, pp. 1-257 (Apr. 2016).

Barton, "LTE and Beyond," LTE, 4G, EPC, MME, PGW, SGW, Interfaces and beyond tech-blog, http://www.lteandbeyond.com/2012/01/gx-interface-sitting-between-pcrf-and.html, pp. 1-5 (Jan. 18, 2012).

"Packet-Filter-Information AVP," http://devzone.tibco.com/sites/2.5.0/diameterchannel/apidocs/index.html?com/tibco/diameterchannel/avp/PacketFilterInformation.html, pp. 1-6 (Jan. 2012).

\* cited by examiner

| Rule Name | Precedence | Filters | Filter ID Used (Example Reference Values 0-255) |
|---|---|---|---|
| Rule 1 | 100 | 2 | 110,111 |
| Rule 2 | 300 | 4 | ~~120,121,122,123~~ 126,127,128,129 |
| Rule 3 | 200 | 4 | 114, 115,116,117 |
| Rule 4 | 250 | 4 | 119,120,121,122 |

| Sequence Number | Rule Precedence | Start Filter ID | Filter Count | Status | Filter Id Used |
|---|---|---|---|---|---|
| 305 | 100 | 100 | 2 | Pending Confirmation | 110,111 |
| 305 | 200 | 114 | 4 | Pending Confirmation | 114, 115, 116, 117 |
| 305 | 300 | 120 | 4 | Pending Confirmation | 120,121,122,123 |
| 307 | 100 | 100 | 2 | Confirmed | 110,111 |
| 307 | 200 | 114 | 4 | Confirmed | 114, 115, 116, 117 |
| 307 | 300 | 120 | 4 | Confirmed | 120,121,122,123 |

| Sequence Number | Rule Precedence | Start Filter ID | Filter Count | Status | Filter Id Used |
|---|---|---|---|---|---|
| 303 | 100 | 100 | 2 | Pending Confirmation | 110,111 |
| 303 | 200 | 114 | 4 | Pending Confirmation | 114, 115, 116, 117 |
| 303 | 300 | 120 | 4 | Pending Confirmation | 120,121,122,123 |
| 309 | 100 | 100 | 2 | Confirmed | 110,111 |
| 309 | 200 | 114 | 4 | Confirmed | 114, 115, 116, 117 |
| 309 | 300 | 120 | 4 | Confirmed | 120,121,122,123 |

| Sequence Number | Rule Precedence | Start Filter ID | Filter Count | Status | Filter Id Used |
|---|---|---|---|---|---|
| 313 | 50 | 23 | 2 | Pending Confirmation | 23, 24 |
| 313 | 100 | 100 | 2 | Confirmed | 110,111 |
| 313 | 200 | 114 | 4 | Confirmed | 114, 115, 116, 117 |
| 313 | 300 | 120 | 4 | Confirmed | 120,121,122,123 |
| 313 | 400 | 130 | 2 | Pending Confirmation | 130, 131 |
| 313 | 500 | 140 | 4 | Pending Confirmation | 140,141,142,143 |
| 316 | 50 | 23 | 2 | Confirmed | 23, 24 |
| 316 | 100 | 100 | 2 | Confirmed | 110,111 |
| 316 | 200 | 114 | 4 | Confirmed | 114, 115, 116, 117 |
| 316 | 300 | 120 | 4 | Confirmed | 120,121,122,123 |
| 316 | 400 | 130 | 2 | Confirmed | 130, 131 |
| 316 | 500 | 140 | 4 | Confirmed | 140,141,142,143 |

| Sequence Number | Rule Precedence | Start Filter ID | Filter Count | Status | Filter Id Used |
|---|---|---|---|---|---|
| 311 | 50 | 23 | 2 | Pending Confirmation | 23, 24 |
| 311 | 100 | 100 | 2 | Confirmed | 110,111 |
| 311 | 200 | 114 | 4 | Confirmed | 114, 115, 116, 117 |
| 311 | 300 | 120 | 4 | Confirmed | 120,121,122,123 |
| 311 | 400 | 130 | 2 | Pending Confirmation | 130, 131 |
| 311 | 500 | 140 | 4 | Pending Confirmation | 140,141,142,143 |
| 318 | 50 | 23 | 2 | Confirmed | 23, 24 |
| 318 | 100 | 100 | 2 | Confirmed | 110,111 |
| 318 | 200 | 114 | 4 | Confirmed | 114, 115, 116, 117 |
| 318 | 300 | 120 | 4 | Confirmed | 120,121,122,123 |
| 318 | 400 | 130 | 2 | Confirmed | 130, 131 |
| 318 | 500 | 140 | 4 | Confirmed | 140,141,142,143 |

| Sequence Number | Rule Precedence | Start Filter ID | Filter Count | Status | Filter Id Used |
|---|---|---|---|---|---|
| 325 | 50 | 23 | 2 | Confirmed | 23, 24 |
| 325 | 80 | 35 | 4 | Confirmed | 35,36,37,38 |
| 325 | 100 | 100 | 2 | Confirmed | 110,111 |
| 325 | 200 | 114 | 4 | Confirmed | 114, 115, 116, 117 |
| 325 | 300 | 120 | 4 | Confirmed | 120,121,122,123 |
| 325 | 400 | 130 | 2 | Confirmed | 130, 131 |
| 325 | 500 | 140 | 4 | Confirmed | 140,141,142,143 |

| Sequence Number | Rule Precedence | Start Filter ID | Filter Count | Status | Filter Id Used |
|---|---|---|---|---|---|
| 327 | 50 | 23 | 2 | Confirmed | 23, 24 |
| 327 | 80 | 35 | 4 | Confirmed | 35,36,37,38 |
| 327 | 100 | 100 | 2 | Confirmed | 110,111 |
| 327 | 200 | 114 | 4 | Confirmed | 114, 115, 116, 117 |
| 327 | 300 | 120 | 4 | Confirmed | 120,121,122,123 |
| 327 | 400 | 130 | 2 | Confirmed | 130, 131 |
| 327 | 500 | 140 | 4 | Confirmed | 140,141,142,143 |

METHODS, SYSTEMS, AND COMPUTER READABLE MEDIA FOR EFFICIENT MAPPING OF RULE PRECEDENCE VALUES AND FILTER PRIORITY VALUES

TECHNICAL FIELD

The subject matter described herein relates generally to filter installation on user equipment in mobile networks. More particularly, the subject matter described herein relates to methods, systems, and computer readable media for efficient mapping of rule precedence values and filter priority values.

BACKGROUND

A $3^{rd}$ Generation Partnership Project (3GPP) mobile network, such as a long term evolution (LTE) network, typically includes a core network, a transport network, and one or more radio access networks. The core network for the mobile network establishes bearers (logical connections) among service nodes on a path between a wireless device, attached to one of the radio access networks, and a packet network, e.g., the Internet. The service nodes then use the bearers to transport subscriber traffic between the wireless device and the packet network.

The core network can include a policy and charging rules function (PCRF) that sends charging rules with packet filters, e.g., service data flows (SDFs) or traffic flow templates (TFTs), to a policy and charging enforcement function (PCEF). Charging rules can include rule precedence values. The PCEF can apply the charging rules based on the rule precedence values and can allocate priority values (e.g., filter identifiers) to the filters corresponding to the precedence values. For example, priority values (e.g., 50, 51, 52) of filters associated with a first precedence value (e.g., 300) will have lower priority values than priority values (e.g., 80, 81, 82) of filters associated with a second precedence value (e.g., 400), when the second precedence value is higher than the first precedence value. The PCEF can send these packet filters to user equipment (UE) for installation, e.g., in a create bearer request or an update bearer request. The UE can store these filters based on the allocated priority values from the PCEF.

Issues and inefficiencies can arise when the PCRF allocates rule precedence values that are unsigned 32 bit (e.g., values between 0 and 4,294,967,295) and the PCEF allocates filter priority values that are 8 bit (e.g., values between 0 and 255). For example, as new packet filters and/or rules with new rule precedence values are added during a session, significant messaging between the PCRF and the PCEF may be used to shift or modify filter priority values such that all packet filters are allocated appropriate filter priority values based on their corresponding rule precedence values.

Accordingly, in light of these difficulties, there exists a need for methods, systems, and computer readable media for efficient mapping of rule precedence values and filter priority values.

SUMMARY

The subject matter described in this specification relates to methods, systems, and computer readable media for efficient mapping of rule precedence values and filter priority values. In some examples, a method occurs at a policy rules node for determining policies in a mobile network. The method may include generating a rule installation request including a rule precedence value, at least one packet filter associated with the rule precedence value, and a filter priority value indicating a first value of a filter priority value range associated with the at least one packet filter. The method may also include sending the rule installation request to a policy enforcement node for installation on user equipment.

According to another aspect of the subject matter described in this specification, a system for efficient mapping of rule precedence values and filter priority values is provided. The system includes at least one processor and a policy rules node for generating policies in mobile network. The policy rules node is implemented using the at least one processor and is configured to perform operations comprising: generating a rule installation request including a rule precedence value, at least one packet filter associated with the rule precedence value, and a filter priority value indicating a first value of a filter priority value range associated with the at least one packet filter; and sending the rule installation request to a policy enforcement node for installation on user equipment.

The subject matter described in this specification may be implemented in hardware, software, firmware, or any combination thereof. As such, the terms 'function', 'node' or 'module' as used herein refer to hardware, software and/or firmware components for implementing the feature(s) being described. In some examples, the subject matter described herein may be implemented using a non-transitory computer readable medium having stored thereon computer executable instructions that when executed by the processor of a computer cause the computer to perform steps.

Computer readable media suitable for implementing the subject matter described herein include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

FIG. 2 depicts example rule precedence values and related filter priority values for an example scenario;

FIG. 4 depicts example mapping information including status information at a policy and charging enforcement function (PCEF);

FIG. 5 depicts example mapping information including status information at a policy and charging rules function (PCRF);

FIG. 6 depicts example mapping information after various updates at the PCEF;

FIG. 7 depicts example mapping information after various updates at the PCRF;

FIG. 8 depicts example mapping information after rules are confirmed at the PCEF;

FIG. 9 depicts example mapping information after rules are confirmed at the PCRF;

DETAILED DESCRIPTION

Figure 1:
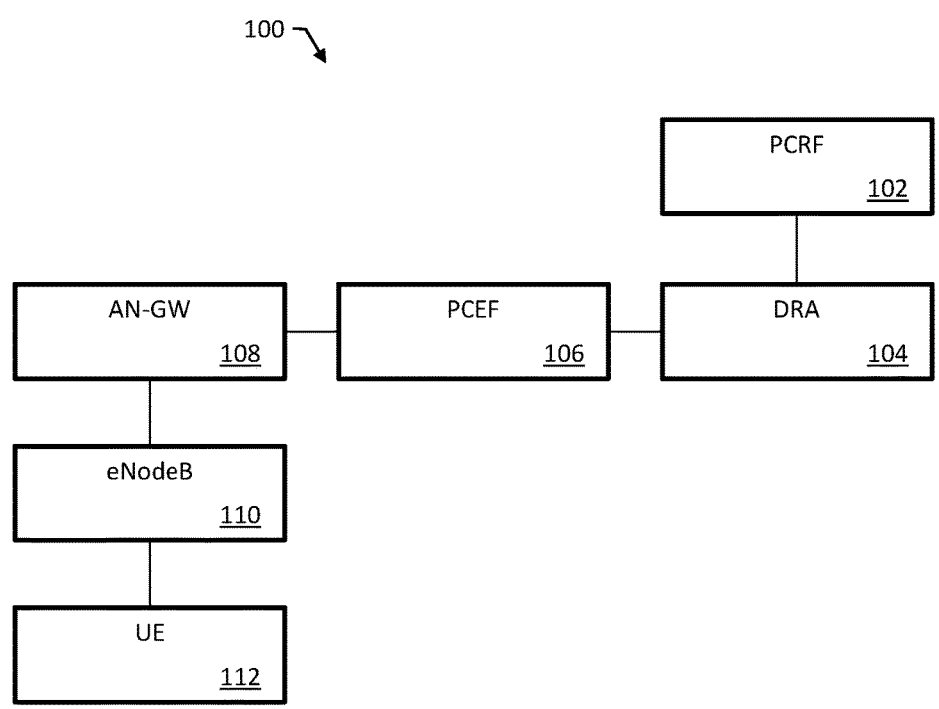
FIG. 1 is a block diagram of a portion of an example core network for a mobile network.

FIG. 1 is a block diagram of a portion of an example core network 100 for a mobile network. The mobile network can be, e.g., a long term evolution (LTE) cellular telecommunications network. Network 100 includes a policy and charging rules function (PCRF) 102, a diameter routing agent (DRA) 104, a policy and charging enforcement function (PCEF) 106, and access network gateway (AN-GW) 108. User equipment (UE) 112 connects to network 100 using an evolved node B (eNodeB) 110 for a radio access network.

PCRF 102 may include one or more processors that perform the operations described in this specification for installing filters on UE 112. For example, PCRF 102 may be implemented on a computing platform includes one or more processor blades, each implementing a PCRF or other function. PCRF 102 may be implemented in a distributed computing system or any appropriate system of one or more computers. PCRF 102 is part of a 3GPP policy charging control (PCC) architecture. The elements of the PCC provide access, resource, and quality-of-service (QoS) control.

In operation, PCRF 102 functions in real-time or near real-time to determine policy rules in the mobile network. PCRF 102 can operate at the network core and access user information and other specialized functions in a centralized manner. PCRF 102 can aggregate information to and from the mobile network, operational supports systems, and other sources in real-time or near real-time, which can be useful for the creation of rules and automatically making policy decisions for each user active on the mobile network. Using PCRF 102, the mobile network can offer multiple services, QoS levels, and charging rules.

In some examples, PCRF 102 provides the ability to manage both network and user policy in real-time or near real-time. PCRF 102 can efficiently and dynamically route and prioritize network traffic. PCRF 102 can provide a unified view of user context based on one or more of device, network, location, and billing data. PCRF 102 can provide key inputs to revenue assurance and bandwidth management.

PCRF 102 can communicate with other systems in network 100 using Diameter. Diameter is an authentication, authorization, and accounting protocol for computer networks. Diameter applications extend the base protocol by adding new commands and/or attributes, e.g., commands and attributes for use with the extensible authentication protocol (EAP). A typical Diameter packet includes a Diameter header and a variable number of attribute-value pairs (AVPs) for encapsulating information relevant to the Diameter message. DRA 104 is configured to route Diameter messages in network 100.

PCEF 106 is configured to enforce any policy and charging control (PCC) decisions made by PCRF 102 and handle service data flows (e.g., forwarding or dropping packets related to a requested service). PCEF 106 communicates with PCEF 106, e.g., via a Gx interface. The Gx interface can be used to install, modify, and remove policy and charging commands and rules between PCRF 102 and PCEF 106 in either pull or push modes.

PCEF 106 may be configured for traffic detection and resultant policy enforcement. PCEF 106 provides information to PCRF 102 about UE 112 and any requested services. For example, PCEF 106 may provide a subscriber identifier (ID), an internet protocol (IP) address of UE 112, and an identifier of a network that provides the requested service.

PCEF 106 is implemented on a computer system comprising one or more processors. For example, PCEF 106 may be implemented in a server such as a packet gateway (PGW) or a computer system integrated with the PGW. The PGW can provide connectivity from UE 112 to external packet data networks by being the point of exit and entry of traffic for or/and from UE 112. PCEF 106, in combination with the PGW, can perform policy enforcement, packet filtering, charging support, packet screening, and the like.

AN-GW 108 is configured for the delivery of data packets to and from a number of mobile stations, e.g., mobile stations within a geographic service area. AN-GW 108 performs tasks including packet routing and transfer, mobility management (attach/detach and location management), logical link management, and authentication and charging functions. The location register of the AN-GW 108 can store location information (e.g., current cell, current VLR) and user profiles (e.g., IMSI, addresses) of GPRS users registered with AN-GW 108.

eNodeB 110 is an element of an LTE radio access network. eNodeB 110 can include the communications hardware that communicates directly with UE 112. eNodeB 110 is configured for operation without a separate controller element, which can simplify the network architecture and allow lower response times. eNodeB 110 can use the S1-AP protocol on the S1-MME interface with a mobility management entity (MME) for control plane traffic, and eNodeB 110 can use the GTP-U protocol on the S1-U interface for user plane traffic.

UE 112 can be any appropriate user computer system. UE 112 typically includes at least one processor, memory, wireless communications hardware, a display, and at least one user input device. UE 112 can be, for example, a wireless mobile device such as a phone, tablet, or laptop.

PCRF 102, PCEF 106, and/or other policy related nodes can be configured to perform various functions, including some functions similar to and/or the same as those described in 3GPP TS 29.212 v13.5.0; the disclosure of which is hereby incorporated in its entirety. For example, PCRF 102 may send, via a Gx interface or another communications interface, a rule containing packet filters (e.g., service data flows (SDFs) or traffic flow templates (TFTs) and a rule precedence value. In this example, PCEF 106 may enforce the filters as instructed by PCRF 102.

PCRF 102 can send filter installation instructions using any appropriate message and attribute-value pairs (AVPs) within the message. For example, PCRF 102 can send a Charging-Rule-Definition as set forth below:

Charging-Rule-Definition::=<AVP Header: 1003>
 {Charging-Rule-Name}
 *[Flow-Information]
 [Precedence]
 other AVPs PCRF 102 can use the flow-information AVP, e.g., a TFT-Packet-Filter-Information AVP. The flow-information AVP is of type grouped. The flow-information AVP is sent from PCRF 102 to PCEF 106 and contains the information from a single IP flow packet filter as set forth below:

Flow-Information::=<AVP Header: 1058>
 [Flow-Description]
 [Packet-Filter-Identifier]

[Packet-Filter-Usage]
[ToS-Traffic-Class]
[Security-Parameter-Index]
[Flow-Label]
[Flow-Direction]
*[AVP]

PCRF 102 can use the flow-description AVP. The flow-description AVP is of type IPFilterRule. The flow-description AVP defines a packet filter for an IP flow with the following information:

Action shall be keyword 'permit'.
Direction shall be keyword 'out'.
Protocol shall be the decimal protocol number or, to indicate that the value is not used for matching packets, the keyword 'ip'.
Source IP address (possibly masked) or, to indicate that the value is not used for matching packets, the keyword 'any'.
Source port is optional and, if present, shall be the decimal port number or port range.
Destination IP address (possibly masked) or, to indicate that the value is not used for matching packets, the keyword 'allocated'.
Destination port is optional and, if present, shall be the decimal port number or port range.

PCRF 102 and PCEF 106 can use a Precedence AVP. The Precedence AVP is of type Unsigned32. Within the Charging Rule Definition AVP, the Precedence AVP determines the order, in which packet filters (e.g., SDF templates consisting of SDF filters) are applied at service data flow detection at the PCEF. For PCC rules with an application detection filter, the Precedence AVP only determines which PCC rule is applicable for the detected application for the enforcement of QoS, for charging control, for reporting of application start and stop and for usage monitoring. A PCC rule with the Precedence AVP with lower value can be applied before a PCC rule with the Precedence AVP with higher value.

For PCRF-initiated IP-CAN session modification cases where PCEF 106 creates new packet filters or SDF filters, PCEF 106 can store an appropriate mapping between the rule precedence value of the Precedence AVP from the PCC rule and the precedence information of the packet filter (e.g., a traffic mapping information filter).

PCEF 106 can maintain the order of the precedence information provided by PCRF 102 for the PCC rules with the precedence information of the new packet filters. The rule precedence value range defined within a PCC rule is operator configurable and can be set based on the IP-CAN type.

The Precedence AVP is also usable within the TFT-Packet-Filter-Information AVP to indicate the evaluation precedence of the packet filters (for GPRS the TFT packet filters) as received from the UE. PCEF 106 can allocate a lower value in the corresponding Precedence AVP to a packet filter with a higher evaluation precedence than to a packet filter with a lower evaluation precedence.

The Precedence AVP is also usable within the Routing-Rule-Definition AVP to indicate the evaluation precedence of the routing filters contained as within the IP flow mobility routing rules. A lower value in the Precedence AVP indicates a higher evaluation precedence. PCEF 106 can allocate the lowest evaluation precedence to a routing filter contain the wild card filter.

As described in 3GPP TS 29.212 v13.5, PCEF 106 can apply rules based on the rule precedence values and can allocate filter priority values to each packet filter (e.g., SDF or TFT filters) associated with a rule. PCEF 106 can then send the filter priority values and packet filters to UE 112 in a create bearer request or an update bearer request for installation. UE 112 can save these filters based on the filter priority values allocated by PCEF 106. A filter priority value can be treated as filter ID on UE 112 and may be referenced with lower values being higher priorities. Issue Issues and inefficiencies can arise when PCRF 102 allocates rule precedence values that are unsigned 32 bit (e.g., values between 0 and 4,294,967,295) and PCEF 106 allocates filter priority values that are 8 bit (e.g., values between 0 and 255). For example, as new packet filters and/or rules with new rule precedence values are added during a session, significant messaging between PCRF 102 and PCEF 106 may be used to shift or modify filter priority values such that all packet filters are allocated appropriate filter priority values, e.g., values that correspond to their respective rule precedence values and do not overlap with other allocated filter priority values.

An example scenario is discussed below that further illustrates some potential issues and/or inefficiencies associated with the functionality described in 3GPP TS 29.212 v13.5.0. In this example scenario, PCRF 102 and PCEF 106 are configured in accordance with functionality described in 3GPP TS 29.212 v13.5.0. Assume PCRF 102 sends a rule '1' with a rule precedence value of '100' and two packet filters. PCEF 106 allocates filter priority values of '110' and '111' to the two packet filters of rule '1', respectively. Assume PCRF 102 also sends a rule '2' with a rule precedence value of '300' and four packet filters. Since the rule precedence value of rule '2' is greater than that of rule '1', PCEF 106 allocates filter priority values to the packet filters of rule '2' that are greater than '110' and '111'. In particular, assume PCEF 106 allocates filter priority values of '120', '121', '122', and '123' to the four packet filters of rule '2', respectively. Assume PCRF 102 also sends a rule '3' with a rule precedence value of '200' and four packet filters. Since the rule precedence value of rule '3' is between that of rule '1' and rule '2', PCEF 106 allocates filter priority values to the packet filters of rule '3' that are greater than '111' and less than '120'. In particular, assume PCEF 106 allocates filter priority values of '114', '115', '116', and '117' to the four packet filters of rule '3', respectively. Also, assume that the above packet filters are successfully installed on UE 112.

Continuing with the example scenario, assume PCRF 102 later sends a rule '4' with a rule precedence value of '250' and four packet filters. Since the rule precedence value of rule '4' is between that of rule '3' and rule '2', PCEF 106 would allocate filter priority values to the packet filters of rule '4' that are greater than '117' and less than '120'. However, such allocation is unavailable since only two values are available (e.g., not allocated) in this range and there are four values needed. To make this allocation for the packet filters of rule '4', PCEF 106 sends an update bearer request (UBReq) to UE 112 for deleting the packets filters associated with rule '2' (e.g., priority filter values '120'-'123') and for re-adding these packet filters using new filter priority values, '126'-'129'. After performing these operations, UE 112 sends an update bearer response (UBres) to PCEF 106 indicating successful installation and PCEF 106 frees filter priority values '120'-'123' for allocation. After the re-allocation of packet filters associated with rule '2', assume PCEF 106 allocates filter priority values of '120', '121', '122', and '123' to the four packet filters of rule '2', respectively, and instructs UE 112 to install the four packet filters of rule '2' and use the filter priority values of '120', '121', '122', and '123' accordingly.

FIG. 2 depicts example rule precedence values and related filter priority values (e.g., filter IDs) for the above example scenario. In FIG. 2, each row represents a rule and related information, e.g., one or more related filter priority values. For example, the row associated with rule '2' includes the original allocated set of filter priority values as strikethrough text (e.g., '120', '121', '122', and '123') and the new set of filter priority values without strikethrough text (e.g., '126', '127', '128', and '129').

As described above, the example scenario involves rule precedence allocation being performed by PCRF 102 and filter priority allocation being performed by PCEF 106. As such, in this example scenario, PCRF 102 is unaware of available filter priority values for associating or mapping with rule precedence. Further, shifting (e.g., removing and re-adding) one or more packet filters to accommodate filter priority values as per rule precedence causes holes of different sizes in a map of available filter priority for UE 112 over period of time. Moreover, shifting one or more packet filters can trigger a number of update Bearer request/response messages. For example, in a cascade scenario, one shift may trigger or initiate a number of subsequent shifts, thereby causing a chain of update bearer request and response messaging, additional processing, and/or inefficient network messaging.

In some examples, PCRF 102, PCEF 106, and/or other policy related nodes can be configured to perform store, maintain, or map rule precedence values and filter priority values (e.g., TFT priority values or TFT IDs). For example, by mapping or storing such values, PCRF 102 can be aware of available filter priority values for associating or mapping with rule precedence and, as such, can allocate for appropriate rule precedence values and filter priority values so as to reduce the amount of filter shifts, thereby reducing related update bearer request and update bearer response messaging.

In some examples, PCRF 102, PCEF 106, and/or other policy related nodes can use one or more rule-filter (RF) data structures, e.g., data structures for storing information related to mapping rule precedence values and filter priority values. In some examples, PCRF 102 and PCEF 106 may both maintain one or more RF data structures per UE or subscriber related identifier, e.g., UE Internet protocol (IP) address.

Table 1 (shown below) depicts an example RF data structure for storing rule precedence values and related filter priority values per UE Internet protocol (IP) address or per another UE or subscriber related identifier. The example RF data structure may store a starting value for a range or set of filter priority values, a number of filters associated with the rule or rule precedence value, and a status to indicate whether related filter priority value(s) or corresponding packet filter(s) are "pending confirmation", "pending removal", or "confirmed".

TABLE 1

| Rule Precedence (0-4, 294, 967, 295) | Starting Filter ID Range (0-255) | Number of Filters | Status |
|---|---|---|---|
| 6000 | 3 | 5 | CONFIRMED |

In some examples, PCRF 102, PCEF 106, and/or other policy related nodes can use one or more messages and/or AVPs for storing and/or communicating information related to mapping rule precedence values and filter priority values.

For example, PCRF 102 and/or PCEF 106 can use a Rule-Precedence-TFT-Filter-MAP-Grouped AVP. The Rule-Precedence-TFT-Filter-MAP-Grouped AVP may be of type grouped. The Rule-Precedence-TFT-Filter-MAP-Grouped AVP can contain information related to mapping or associating rule precedence values and filter priority values as set forth below:

Rule-Precedence-TFT-Filter-MAP-Grouped::=<AVP
      Header:???>
    [Rule Precedence]
    [TFT-Filter-ID-MAP]
    [TFT-Count]

The Rule Precedence AVP can be of type Unsigned32 or another type and can be used for determining the order, in which packet filters (e.g., service data flow templates consisting of service data flow filters) are applied at service data flow detection at PCEF 106.

The TFT-Filter-ID-MAP AVP can be of type OctetString or another type (e.g., unsigned8) and can be used for indicating a starting value for a range or set of filter priority values associated with a corresponding rule precedence value.

The TFT-Count AVP can be of type OctetString or another type (e.g., unsigned8) and can be used for indicating a count or amount of filters associated with a corresponding rule precedence value.

PCRF 102 and/or PCEF 106 can also use a Rule-Precedence-Override AVP for indicating if rule precedence of statically configured and/or predefined rules can be overridden. The Rule-Precedence-TFT-Filter-MAP-Grouped AVP may be of type Boolean (e.g., 'True' or 'False') or another type.

In some examples, PCRF 102 and PCEF 106 can allocate filter priority values (e.g., filter IDs) for packet filters associated with a PCC rule or a related rule precedence value. For example, if PCRF 102 sends a rule installation request with a charging rule AVP and a rule precedence value, PCRF 102 may also send a TFT-Filter-ID-MAP AVP with a start ID or value for the packet filters associated with the rule and may reserve the filter priority value range based on the start value and the number of filters associated with the rule. In this example, PCRF 102 may map or associate this filter priority value range and the corresponding rule precedence value and may store status information for this association indicating 'pending confirmation' in an RF data structure. After getting confirmation of a successful rule installation on UE 112, PCRF 102 may update the status information from 'pending confirmation' to 'confirmed'.

In some examples, e.g., when PCRF 102 is requesting that a new rule or related packet filters be installed on UE 112, PCRF 102 may determine an available range or set of filter priority values using an RF data structure containing existing rule precedence values and related filter priority values for UE 112. Based on this information, PCRF 102 may allocate a new rule precedence value for the new rule before instructing PCEF 106 to install the new rule on UE 112.

In some examples, e.g., when PCRF 102 is requesting that a rule or related packet filters be removed from UE 112, PCRF 102 may update status information in an RF data structure. In response to the removal request, the status information related to the rule and/or related packet filters may be changed from 'confirmed' to 'pending removal' and, after receiving confirmation from PCEF 106 that UE 112 has successfully removed the rule and/or related packet filters, PCRF 102 may remove the data entry (e.g., association) from the RF data structure.

In some examples, PCRF 102 and PCEF 106 may allocate only filter priority values that are completely freed. For example, PCRF 102 may not be considered for allocation filter priority values that are associated with a status of 'pending removal', 'pending confirmation', or 'confirmed'. In another example, filter priority values associated with statuses of 'pending removal' may not be allocated until the removal is confirmed (e.g., after related packet filter and/or rule is successful removed from UE 112).

In some examples, if a failure is received by PCRF102 for a rule installation request to PCEF 106, a data entry associated with the failed installation (e.g., having a status of 'pending confirmation' before the failure) can be cleared or deleted immediately at PCRF 102 from an RF data structure.

In some examples, a rule installation failure may include a Rule-Precedence-TFT-Filter-MAP-Grouped AVP for indicating a mismatch between PCEF 106 and PCRF 102 for a particular filter priority value range. In such examples, PCRF 102 may update its RF data structure or map accordingly for any pending confirmation rules and may also send a new rule installation request that indicates a different, available filter priority value range to use.

In some examples, when PCRF 102 is sending rule precedence information (e.g., for predefined rules), PCRF 102 may send information for indicating a corresponding filter priority value range. In such examples, the rule precedence information provided by PCRF 102 may override the rule precedence information configured at PCEF 106.

In some examples, PCEF 106 may maintain an RF data structure (e.g., rule precedence and TFT Filter Map) per UE IP address and may update the RF data structure per request received from PCRF 102. For example, PCEF may receive a rule installation request with a set of filter priority values from PCRF 102 and may perform the rule installation using the set of filter priority values.

In some examples, if a local operation is performed at PCEF 106 which impacts an RF data structure at PCEF 106, PCEF 106 may send, to PCRF 102, information about the local operation and/or changes to the RF data structure. For example, PCEF 106 may send a CCR-U message containing a Rule-Precedence-TFT-Filter-MAP-Grouped AVP that indicates changes in an RF data structure at PCEF 106.

In some examples, if PCEF 106 determines that a filter priority value range provided by PCRF 102 is already allocated, PCEF 106 may send a rule installation failure along with information from an RF data structure at PCEF 106 indicating the rule precedence value and the filter priority value range that causes the conflict.

In some examples, if there are discrepancies or differences in RF data structures at PCEF 106 and PCRF 102, the data in the RF data structure at PCEF 106 may be deemed the correct copy and corresponding rule installation and removal may be done based on this copy to get both RF data structures at PCEF 106 and PCRF 102 consistent with each other.

In some examples, only PCRF 102 may be configured to perform filter priority value allocation. In such examples, when PCEF 106 needs to install any rule as part of predefined or static rule, PCEF 106 may send a rule precedence value and a filter count in a CCR-U request or other message and PCRF 102 may respond with an allocated filter priority value range.

In some examples, PCEF 106 may be able to inform PCRF 102 that, if needed, PCRF 102 can override the requested rule precedence value in the indicated range. For example, PCEF 106 may use a Rule-Precedence-Override AVP for indicating if a rule precedence value of a statically configured and/or predefined rule can be overridden.

Figure 3A:
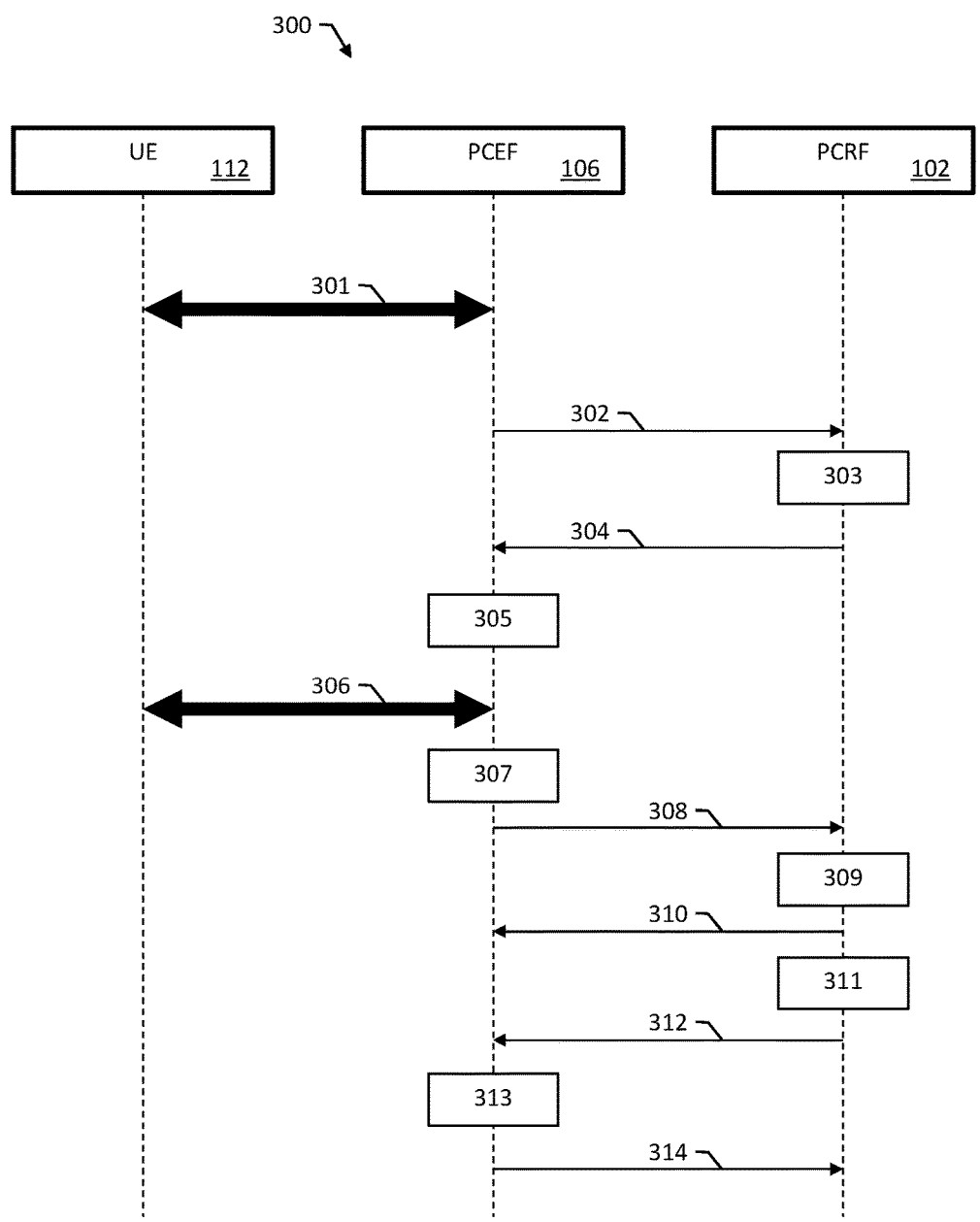
FIGS. 3A-B depicts a messaging diagram of an example messaging sequence illustrating installation of rules containing filters and related mapping of rule precedence values and filter priority values.
Figure 3B:
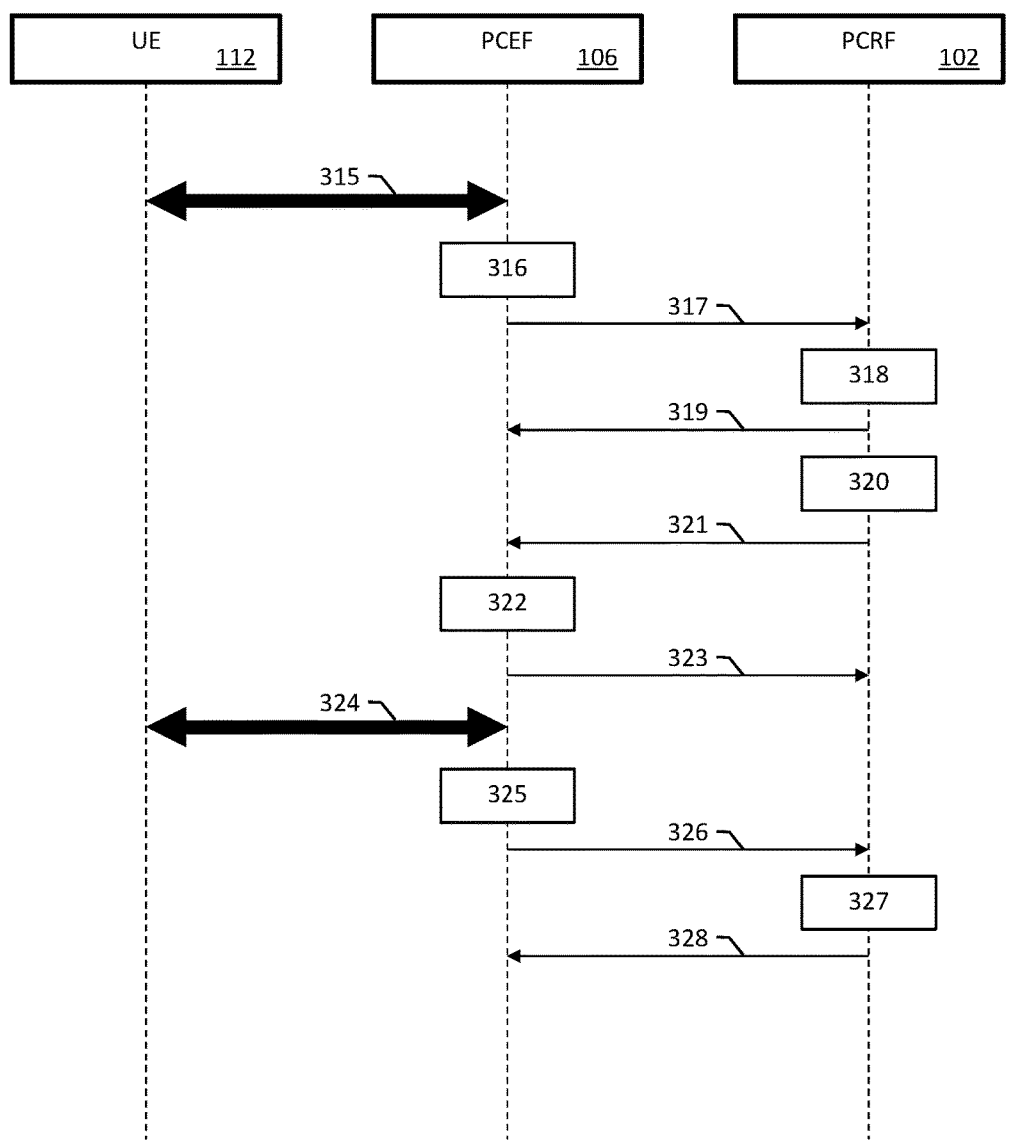

FIGS. 3A-B depicts a messaging sequence 300 of an example messaging sequence illustrating installation of rules containing packet filters in the network 100 of FIG. 1 and related mapping of rule precedence values and filter priority values (e.g., filter IDs). Each reference number in message sequence 300 may represent a message and/or action performed.

Referring to FIG. 3A, messaging sequence 300 may begin with an exchange of session establishment messaging 301. Default and dedicated bearers are created for UE 112 as a result of session establishment messaging 301. For example, the default bearer can be created with a create session request message, and the dedicated bearer can be created with a create session request or create bearer request message.

After session establishment messaging 301, PCEF may send a message 302 to PCRF 102 for requesting credit control information. For example, message 302 may be a credit-control-request (CCR) message or another message.

PCRF 102 may generate rules containing packet filters and may allocate available filter priority value ranges for each rule based on a map of filter priority values and associated rule information, e.g., rule precedence values (303).

PCRF 102 may send an answer message 304 with rules containing packet filters. In some examples, message 304 may be a credit-control-answer (CCA) message and may include one or more AVPs for indicating a start filter ID, one or more packet filters, and a rule precedence value for each PCC rule. For example, message 304 may include a rule '1' containing a start filter ID of '110', a packet filter amount or count of '2', a rule precedence value of '100', a rule '2' containing a start filter ID of '126', a packet filter amount or count of '4', a rule precedence value of '300', and a rule '3' containing a start filter ID of '114', a packet filter amount or count of '4', a rule precedence value of '200'.

PCEF 106 may install and enforce the rules from message 304 (305). PCEF 106 may also create and/or update bearers according to the rules.

PCEF 106 may install packet filters associated with the rules using a session establishing messaging 306.

After successful installation of the rules on UE 112, PCEF 106 may update mapping information related to the rules and packet filters (307).

FIG. 4 depicts example mapping information including status information at PCEF 106. In FIG. 4, data structure 400 may store information related to mapping rule precedence values and filter priority values. Each row represents an association between a rule precedence value and related packet filter information and includes information discussed above in regard to actions 305 and 307. For example, data structure 400 includes statuses of rules and/or packet filters associated with actions 305 (e.g., in rows with a sequence number of '305') of 'pending confirmation' and, after message 306 is received indicating successful installation on UE 112, the statuses of rules and/or packet filters associated with action 307 (e.g., in rows with a sequence number of '307') are changed to 'confirmed'.

It will be appreciated that data depicted in FIG. 4 is illustrative and that different and/or additional data may be used for mapping of rule and packet filter information. For example, sequence numbers in data structure 400 are for easily correlating depicted data to example message sequence 300 but need not be stored in an example data structure used for associating rule precedence values and related filter priority values. Further, while FIG. 4 depicts substantially duplicate rules with different statuses for illustration, it will be appreciated that other example data structures may store one copy of the rules and update status information thereof as needed.

PCEF 106 may send a message 308 for notifying PCRF 102 that the rules are successfully installed on UE 112. For example, message 308 may be a CCR update (CCR-U) message or another message.

After receiving message 308, PCRF 102 may update mapping information related to the rules and related packet filters (309).

FIG. 5 depicts example mapping information including status information at PCRF 102. In FIG. 5, data structure 500 may store information related to mapping rule precedence values and filter priority values. Each row represents an association between a rule precedence value and related packet filter information and includes information discussed above in regard to actions 303 and 309. For example, data structure 500 includes statuses of rules and/or packet filters associated with action 303 (e.g., in rows with a sequence number of '303') of 'pending confirmation' and, after message 308 is received indicating successful installation on UE 112, the statuses of rules and/or packet filters associated with action 309 (e.g., rows with a sequence number of '309') are changed to 'confirmed'.

It will be appreciated that data depicted in FIG. 5 is illustrative and that different and/or additional data may be used for mapping of rule and packet filter information. For example, sequence numbers in data structure 500 are for easily correlating depicted data to example message sequence 300 but need not be stored in an example data structure used for associating rule precedence values and related filter priority values. Further, while FIG. 5 depicts substantially duplicate rules with different statuses for illustration, it will be appreciated that other example data structures may store one copy of the rules and update status information thereof as needed.

PCRF 102 may generate and send an answer message 310 indicating that the mapping information is updated. For example, message 310 may be a CCA update (CCA-U) message or another message.

At a subsequent time, PCRF 102 may generate rules containing packet filters and may allocate available filter priority value ranges for each rule based on a map of filter priority values and associated rule information, e.g., rule precedence values (311).

PCRF 102 may send a message 312 with new rules containing packet filters. In some examples, message 312 may be a re-auth-request (RAR) message and may include one or more AVPs for indicating a start filter ID, one or more packet filters, and a rule precedence value for each PCC rule. For example, message 312 may include a rule '4' containing a start filter ID of '140', a packet filter amount or count of '4', a rule precedence value of '500', a rule '5' containing a start filter ID of '23', a packet filter amount or count of '2', a rule precedence value of '50', and a rule '6' containing a start filter ID of '130', a packet filter amount or count of '2', a rule precedence value of '400'.

PCEF 106 may install and enforce the rules from message 312 (313). PCEF 106 may also create and/or update bearers according to the rules.

PCEF 106 may send a message 314 for notifying PCRF 102 that the rules are successfully installed on PCEF 106. For example, message 314 may be a re-auth-answer (RAA) message or another message.

PCEF 106 may install packet filters associated with the rules using a session establishing messaging 315.

After successful installation of the rules on UE 112, PCEF 106 may update mapping information related to the rules and packet filters (316).

FIG. 6 depicts example mapping information after various updates at PCEF 106. In FIG. 6, data structure 600 may store information related to mapping rule precedence values and filter priority values. Each row represents an association between a rule precedence value and related packet filter information and includes information discussed above in regard to actions 313 and 316. For example, data structure 600 includes statuses of rules and/or packet filters associated with action 313 of 'pending confirmation' and, after message 316 is received indicating successful installation on UE 112, the statuses of rules and/or packet filters associated with action 316 are changed to 'confirmed'.

It will be appreciated that data depicted in FIG. 6 is illustrative and that different and/or additional data may be used for mapping of rule and packet filter information. For example, sequence numbers in data structure 600 are for easily correlating depicted data to example message sequence 300 but need not be stored in an example data structure used for associating rule precedence values and related filter priority values. Further, while FIG. 6 depicts substantially duplicate rules with different statuses for illustration, it will be appreciated that other example data structures may store one copy of the rules and update status information thereof as needed.

PCEF 106 may send a message 317 for notifying PCRF 102 that the rules are successfully installed on UE 112. For example, message 317 may be a CCR-U message or another message.

After receiving message 317, PCRF 102 may update mapping information related to the rules and related packet filters (318).

FIG. 7 depicts example mapping information after various updates at PCRF 102. In FIG. 7, data structure 700 may store information related to mapping rule precedence values and filter priority values. Each row represents an association between a rule precedence value and related packet filter information and includes information discussed above in regard to actions 311 and 318. For example, data structure 600 includes statuses of rules and/or packet filters associated with action 311 of 'pending confirmation' and, after message 317 is received indicating successful installation on UE 112, the statuses of rules and/or packet filters associated with action 318 are changed to 'confirmed'.

It will be appreciated that data depicted in FIG. 7 is illustrative and that different and/or additional data may be used for mapping of rule and packet filter information. For example, sequence numbers in data structure 700 are for easily correlating depicted data to example message sequence 300 but need not be stored in an example data structure used for associating rule precedence values and related filter priority values. Further, while FIG. 7 depicts substantially duplicate rules with different statuses for illustration, it will be appreciated that other example data structures may store one copy of the rules and update status information thereof as needed.

PCRF 102 may generate and send an answer message 319 indicating that the mapping information stored at PCRF 102 is updated. For example, message 319 may be a CCA-U message or another message.

At a subsequent time, PCRF 102 may generate rules containing packet filters and may allocate available filter priority value ranges for each rule based on a map of filter priority values and associated rule information, e.g., rule precedence values (320).

PCRF 102 may send a message 321 with new rules containing packet filters. In some examples, message 321 may be a RAR message and may include one or more AVPs for indicating a start filter ID, one or more packet filters, and a rule precedence value for each PCC rule. For example, message 321 may include a rule 7' containing a start filter ID of '35', a packet filter amount or count of '4', a rule precedence value of '80'.

PCEF 106 may install and enforce the rules from message 321 (322). PCEF 106 may also create and/or update bearers according to the rules.

PCEF 106 may send a message 323 for notifying PCRF 102 that the rules are successfully installed on PCEF 106. For example, message 323 may be an RAA message or another message.

PCEF 106 may install packet filters associated with the rules using a session establishing messaging 324.

After successful installation of the rules on UE 112, PCEF 106 may update mapping information related to the rules and packet filters (325).

FIG. 8 depicts example mapping information after rules are confirmed at PCEF 106. In FIG. 8, data structure 800 may store information related to mapping rule precedence values and filter priority values. Each row represents an association between a rule precedence value and related packet filter information and includes information discussed above in regard to action 325. For example, data structure 800 depicts a new rule associated with rule precedence values '80' and a status of 'confirmed' after packet filters associated with the new rule are successfully installed on UE 112.

It will be appreciated that data depicted in FIG. 8 is illustrative and that different and/or additional data may be used for mapping of rule and packet filter information. For example, sequence numbers in data structure 800 are for easily correlating depicted data to example message sequence 300 but need not be stored in an example data structure used for associating rule precedence values and related filter priority values.

PCEF 106 may send a message 326 for notifying PCRF 102 that the rules are successfully installed on UE 112. For example, message 326 may be a CCR-U message or another message.

After receiving message 326, PCRF 102 may update mapping information related to the rules and related packet filters (327).

FIG. 9 depicts example mapping information after rules are confirmed at PCRF 102. In FIG. 9, data structure 900 may store information related to mapping rule precedence values and filter priority values. Each row represents an association between a rule precedence value and related packet filter information and includes information discussed above in regard to action 327. For example, data structure 900 depicts a new rule associated with rule precedence values '80' and having a status of 'confirmed' after receiving a notification from PCEF 106 that packet filters associated with the new rule are successfully installed on UE 112.

It will be appreciated that data depicted in FIG. 9 is illustrative and that different and/or additional data may be used for mapping of rule and packet filter information. For example, sequence numbers in data structure 900 are for easily correlating depicted data to example message sequence 300 but need not be stored in an example data structure used for associating rule precedence values and related filter priority values.

After updating mapping information, PCRF 102 may generate and send an answer message 328 indicating that the mapping information stored at PCRF 102 is updated. For example, message 328 may be a CCA-U message or another message.

It will be appreciated that message sequence 300 in FIGS. 3A-B is for illustrative purposes and that different and/or additional messages and/or actions may be used for efficient mapping of rule precedence values and filter priority values or related functionality. It will also be appreciated that various messages and/or actions described herein with regard to message sequence 300 may occur in a different order or sequence.

Figure 10:
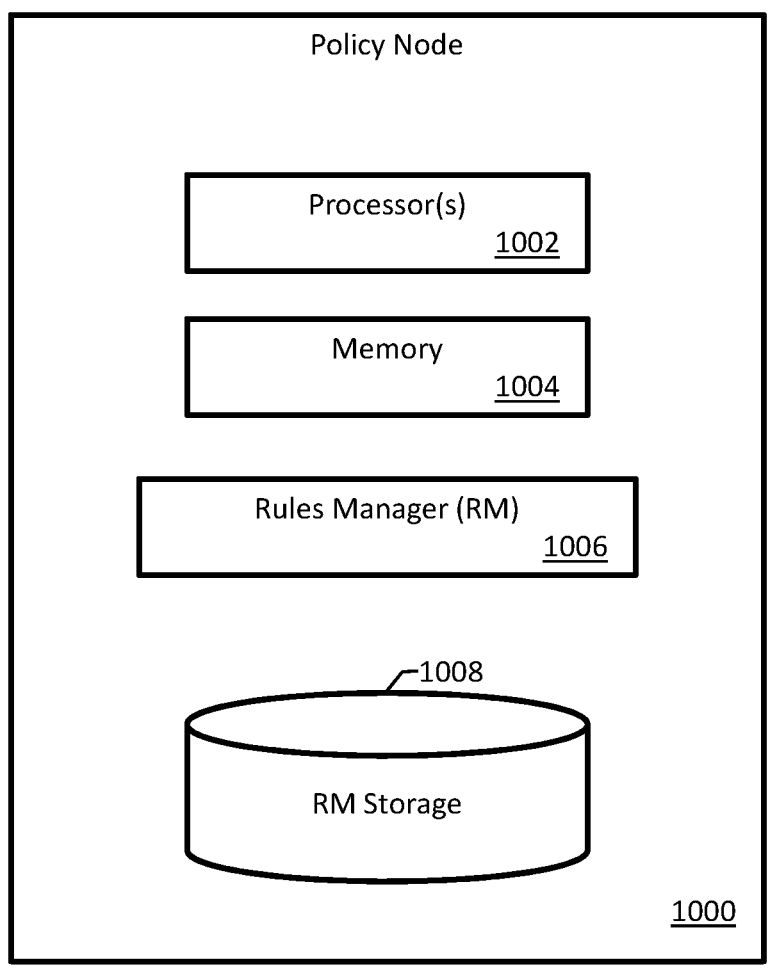
FIG. 10 is a block diagram of an example policy node configured for efficient mapping of rule precedence values and filter priority values.

FIG. 10 is a block diagram of an example policy node 1000 configured for efficient mapping of rule precedence values and filter priority values. Policy node 1000 includes one or more processors 1002 and memory 1004 storing executable instructions for processors 1002. Policy node 1000 is configured, by virtue of appropriate programming, to implement a rules manager (RM) 1006 for managing rules or related associations between rules and packets filters associated with a UE. For example, policy node 1000 may maintain in one or more data structures information for associating or mapping rules and their rule precedence values with related packet filters and their priority values (e.g., filter priority values) and may store this information for each UE associated with policy node 1000.

In some examples, where policy node 1000 is a policy enforcement node (e.g., PCEF 106), policy node 1000 may enforce rules and install packet filters on one or more UEs. In some examples, where policy node 1000 is a policy rules node, policy node 1000 may generate and send rules containing packet filters to a policy enforcement node.

RM 1006 may represent any suitable entity or entities (e.g., a field-programmable gate array (FPGA), an application-specific integrated circuit (ASIC), and/or software executing on a processor) for performing one or more aspects associated with efficient mapping of rule precedence values and filter priority values. For example, RM 1006 may be configured to allocate a filter priority value range when sending a PCC rule containing a rule precedence value. In this example, RM 1006 may be configured to store associations between rule precedence values and the filter priority value range allocated to the rules. Continuing with this example, RM 1006 may also be configured to store status of various rules and/or related packet filters, whereby the status indicate whether rules and/or related packet filters have been successfully installed, pending confirmation (of installation on UE 112), or pending removal (from UE).

RM 1006 can include or access RM storage 1008. RM storage 1008 may represent any suitable entity or entities (e.g., non-transitory computer readable media, flash memory, random access memory, and/or a storage device) for storing information related to rules, packet filters, and/or related information, e.g., filter priority values, rule related status information, and/or metrics associated with rules or packet filters. For example, RM storage 1008 may store mappings or associations involving PCC rules and related packet filters for each UE associated with policy node 1000. In this example, RM storage 1008 may use one or more data structures for associating rule precedence values and filter priority values (e.g., filter IDs) among other data, such as rule installation statuses, packet filter counts associated with rule precedence values and/or start filter priority values for indicating the start of filter priority value ranges associated with rule precedence values. In some examples, RM storage 1008 may be external to and/or or integrated with policy node 1000 and/or RM 1006.

It will be appreciated that FIG. 10 is for illustrative purposes and that various entities and/or functionality described above in relation to FIG. 10 may be changed, altered, added, or removed. For example, some nodes and/or functions may be combined into a single entity. In another example, some nodes and/or functions may be distributed across multiple nodes and/or platforms.

Figure 11:
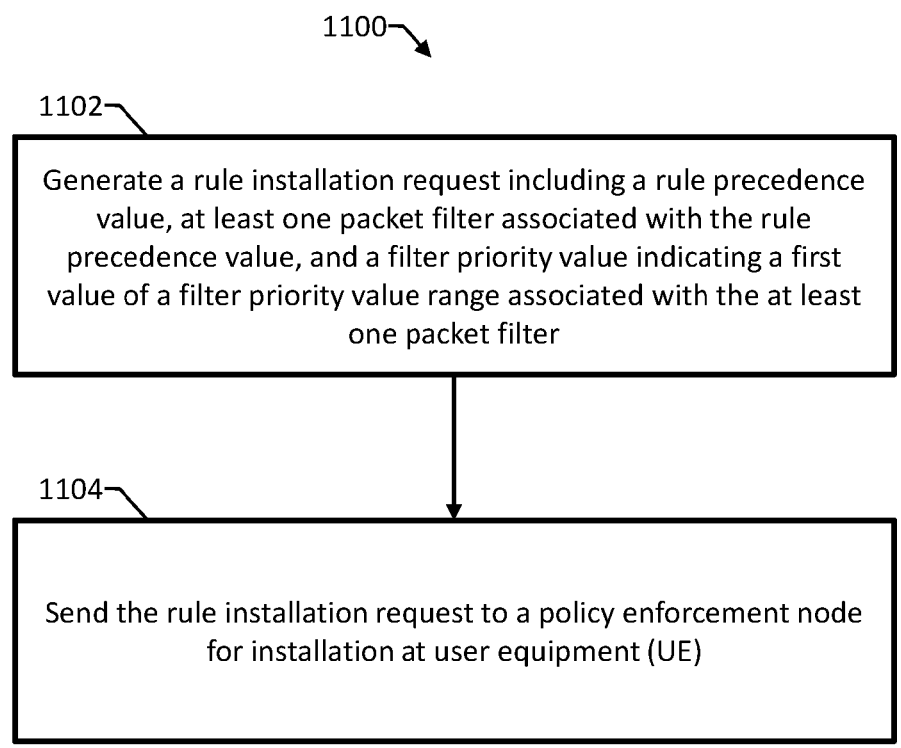
FIG. 11 is a flow diagram of an example method for efficient mapping of rule precedence values and filter priority values.

FIG. 11 is a flow diagram of an example method 1100 for efficient mapping of rule precedence values and filter priority values. Method 1100 can be performed by a policy rules node or RM 1006 implemented on one or more computer systems, e.g., PCRF 102 of FIG. 1 or policy node 1000 of FIG. 10.

Method 1100 includes generating a rule installation request including a rule precedence value, at least one packet filter associated with the rule precedence value, and a filter priority value indicating a first value of a filter priority value range associated with the at least one packet filter (1102).

Method 1100 includes sending the rule installation request to a policy enforcement node for installation on UE (1104).

In some examples, a policy rules node may perform operations comprising: receiving, from a policy enforcement node, a rule installation failure including mapping information indicating associations between rule precedence values and filter priority values for a UE stored at the policy enforcement node, wherein the rule installation failure is sent in response to the policy enforcement node determining that a filter priority value range indicated in the rule installation request is already allocated; and updating, using the mapping information, associations between rule precedence values and filter priority values for the UE stored at the policy rules node.

In some examples, a policy rules node may perform operations comprising receiving, from a policy enforcement node, a rule installation response indicating that at least one packet filter is successfully installed on a UE associated with the mobile network.

In some examples, a policy rules node may perform operations comprising: receiving, from the policy enforcement node, a map update request including mapping information indicating associations between rule precedence values and filter priority values for the UE stored at the policy enforcement node, wherein the map update is sent in response to the policy enforcement node modifying the associations between rule precedence values and filter priority values for the UE stored at the policy enforcement node; and updating, using the mapping information, associations between rule precedence values and filter priority values for the UE stored at the policy rules node.

In some examples, a policy rules node may store associations between rule precedence values and filter priority values for the UE.

In some examples, a policy enforcement node may store associations between rule precedence values and filter priority values for the UE.

In some examples, a policy rules node may store a status associated with at least one packet filter associated with a rule precedence value, wherein the status indicates that the at least one packet filter is successfully installed, pending confirmation, or pending removal.

In some examples, a rule installation request includes an attribute value pair (AVP), a Charging-Rule-Definition AVP, a Precedence AVP, a TFT-Packet-Filter-Information AVP, a Rule-Precedence-TFT-Filter-MAP-Grouped-AVP, a Rule Precedence AVP, a TFT-Filter-ID-MAP AVP, a TFT-Count-AVP, or a Rule-Precedence-Override AVP.

In some examples, a mobile network may be an LTE network, a policy enforcement node may be an LTE PCEF or PGW, and a policy rules node may be an LTE PCRF.

While the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications, and alternative embodiments, within its scope and including equivalents of the claims.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for efficient mapping of rule precedence values and filter priority values, the method comprising:

at a policy rules node for determining policies in a mobile network:

generating a rule installation request including a rule precedence value, at least one packet filter associated with the rule precedence value, and a filter priority value indicating a first value of a filter priority value range associated with the at least one packet filter;

sending the rule installation request to a policy enforcement node for installation on user equipment (UE);

receiving, from the policy enforcement node, a rule installation failure including mapping information indicating associations between rule precedence values and filter priority values for the UE stored at the policy enforcement node, wherein the rule installation failure is sent in response to the policy enforcement node determining that the filter priority value range indicated in the rule installation request is already allocated; and updating, using the mapping information, associations between rule precedence values and filter priority values for the UE stored at the policy rules node.

2. The method of claim 1, comprising:

sending a new rule installation request that indicates a different filter priority value range associated with the at least one packet filter; and receiving, from a policy enforcement node, a rule installation response indicating that the at least one packet filter is successfully installed on the UE.

3. A method for efficient mapping of rule precedence values and filter priority values, the method comprising:

at a policy rules node for determining policies in a mobile network:

generating a rule installation request including a rule precedence value, at least one packet filter associated with the rule precedence value, and a filter priority value indicating a first value of a filter priority value range associated with the at least one packet filter;

sending the rule installation request to a policy enforcement node for installation on user equipment (UE);

receiving, from the policy enforcement node, a map update request including mapping information indicating associations between rule precedence values and filter priority values for the UE stored at the policy enforcement node, wherein the map update is sent in response to the policy enforcement node modifying the associations between rule precedence values and filter priority values for the UE stored at the policy enforcement node; and updating, using the mapping information, associations between rule precedence values and filter priority values for the UE stored at the policy rules node.

4. The method of claim 1, wherein the policy rules node stores associations between rule precedence values and filter priority values for the UE.

5. The method of claim 1, wherein the policy enforcement node stores associations between rule precedence values and filter priority values for the UE.

6. The method of claim 1, wherein the policy rules node stores a status associated with the at least one packet filter associated with the rule precedence value, wherein the status indicates that the at least one packet filter is successfully installed, pending confirmation, or pending removal.

7. The method of claim 1, wherein the rule installation request includes an attribute value pair (AVP), a Charging-Rule-Definition AVP, a Precedence AVP, a TFT-Packet-Filter-Information AVP, a Rule-Precedence-TFT-Filter-MAP-Grouped-AVP, a Rule Precedence AVP, a TFT-Filter-ID-MAP AVP, a TFT-Count-AVP, or a Rule-Precedence-Override AVP.

8. The method of claim 1, wherein the mobile network is a long term evolution (LTE) network, the policy enforcement node is an LTE policy and charging enforcement function (PCEF) or a packet gateway (PGW), and the policy rules node is an LTE policy and charging rules function (PCRF).

9. A system for efficient mapping of rule precedence values and filter priority values, the system comprising:
at least one processor; and
a policy rules node for determining policies in a mobile network, the policy rules node implemented using the at least one processor and configured to perform operations comprising:
generating a rule installation request including a rule precedence value, at least one packet filter associated with the rule precedence value, and a filter priority value indicating a first value of a filter priority value range associated with the at least one packet filter;
sending the rule installation request to a policy enforcement node for installation on user equipment (UE);
receiving, from the policy enforcement node, a rule installation failure including mapping information indicating associations between rule precedence values and filter priority values for the UE stored at the policy enforcement node, wherein the rule installation failure is sent in response to the policy enforcement node determining that the filter priority value range indicated in the rule installation request is already allocated; and updating, using the mapping information, associations between rule precedence values and filter priority values for the UE stored at the policy rules node.

10. The system of claim 9, the operations comprising:
sending a new rule installation request that indicates a different filter priority value range associated with the at least one packet filter; and
receiving, from a policy enforcement node, a rule installation response indicating that the at least one packet filter is successfully installed on the UE.

11. A system for efficient mapping of rule precedence values and filter priority values, the system comprising:
at least one processor; and
a policy rules node for determining policies in a mobile network, the policy rules node implemented using the at least one processor and configured to perform operations comprising:
generating a rule installation request including a rule precedence value, at least one packet filter associated with the rule precedence value, and a filter priority value indicating a first value of a filter priority value range associated with the at least one packet filter;
sending the rule installation request to a policy enforcement node for installation on user equipment (UE);
receiving, from the policy enforcement node, a map update request including mapping information indicating associations between rule precedence values and filter priority values for the UE stored at the policy enforcement node, wherein the map update is sent in response to the policy enforcement node modifying the associations between rule precedence values and filter priority values for the UE stored at the policy enforcement node; and
updating, using the mapping information, associations between rule precedence values and filter priority values for the UE stored at the policy rules node.

12. The system of claim 9, wherein the policy rules node stores associations between rule precedence values and filter priority values for the UE.

13. The system of claim 9, wherein the policy enforcement node stores associations between rule precedence values and filter priority values for the UE.

14. The system of claim 9, wherein the policy rules node stores a status associated with the at least one packet filter associated with the rule precedence value, wherein the status indicates that the at least one packet filter is successfully installed, pending confirmation, or pending removal.

15. The system of claim 9, wherein the rule installation request includes an attribute value pair (AVP), a Charging-Rule-Definition AVP, a Precedence AVP, a TFT-Packet-Filter-Information AVP, a Rule-Precedence-TFT-Filter-MAP-Grouped-AVP, a Rule Precedence AVP, a TFT-Filter-ID-MAP AVP, a TFT-Count-AVP, or a Rule-Precedence-Override AVP.

16. The system of claim 9, wherein the mobile network is a long term evolution (LTE) network, the policy enforcement node is an LTE policy and charging enforcement function (PCEF) or a packet gateway (PGW), and the policy rules node is an LTE policy and charging rules function (PCRF).

17. A non-transitory computer readable medium having stored thereon executable instructions that when executed by one or more processors control the one or more processors to perform operations comprising:
at a policy rules node for determining policies in a mobile network:

generating a rule installation request including a rule precedence value, at least one packet filter associated with the rule precedence value, and a filter priority value indicating a first value of a filter priority value range associated with the at least one packet filter;

sending the rule installation request to a policy enforcement node for installation on user equipment (UE);

receiving, from the policy enforcement node, a rule installation failure including mapping information indicating associations between rule precedence values and filter priority values for the UE stored at the policy enforcement node, wherein the rule installation failure is sent in response to the policy enforcement node determining that the filter priority value range indicated in the rule installation request is already allocated; and updating, using the mapping information, associations between rule precedence values and filter priority values for the UE stored at the policy rules node.

* * * * *

UNITED STATES PATENT AND TRADEMARK OFFICE
CERTIFICATE OF CORRECTION

PATENT NO. : 10,187,217 B1  
APPLICATION NO. : 15/647210  
DATED : January 22, 2019  
INVENTOR(S) : Juneja Page 1 of 1

It is certified that error appears in the above-identified patent and that said Letters Patent is hereby corrected as shown below:

On the Title Page

Column 2, under Attorney Agent, or Firm, Line 1, delete "Taylor" and insert -- Taylor, --, therefor.

On page 2, Column 1, under Other Publications, Line 6, delete "LTD;" and insert -- LTE; --, therefor.

On page 2, Column 1, under Other Publications, Line 7, delete "Chargin" and insert -- Charging --, therefor.

In the Specification

In Column 6, Line 6, delete "priorities. Issue" and insert -- priorities. --, therefor.

Signed and Sealed this  
Twenty-fourth Day of March, 2020

Andrei Iancu  
*Director of the United States Patent and Trademark Office*